United States Patent [19]

Fetsko

[11] Patent Number: 4,817,893
[45] Date of Patent: Apr. 4, 1989

[54] GROMMET AND CONNECTOR LINK PROTECTOR SHIELD

[76] Inventor: Thomas M. Fetsko, 4422 Homestead-Duquesne Rd., Munhall, Pa. 15120

[21] Appl. No.: 46,428

[22] Filed: May 6, 1987

[51] Int. Cl.$^4$ .............................. B64D 17/24
[52] U.S. Cl. ............................ 244/142; 244/151 A
[58] Field of Search .............. 244/904, 149, 147, 142, 244/152, 151 A; 24/241 R, 230.5 R, 231, 236; 59/93, 84, 86

[56] References Cited

U.S. PATENT DOCUMENTS

| | | | |
|---|---|---|---|
| 505,882 | 10/1893 | Mouch | 24/231 |
| 1,079,907 | 11/1913 | Weed | 59/93 |
| 2,104,193 | 1/1938 | Gerwig | 24/236 |
| 2,267,791 | 12/1941 | Finlayson | 244/142 |
| 2,310,359 | 2/1943 | Finlayson | 244/142 |
| 2,405,333 | 9/1946 | Sheridan | 244/151 A |
| 2,829,414 | 4/1958 | Thomas | 244/151 A |
| 3,065,513 | 11/1962 | Warner et al. | 24/265 |
| 3,245,639 | 4/1966 | Mitchell | 244/152 |
| 3,922,762 | 12/1975 | Turner et al. | 24/230 R |
| 3,934,848 | 1/1976 | Snyder | 244/151 A |
| 4,024,608 | 5/1977 | Brewer | 24/231 |
| 4,398,387 | 8/1983 | Bary | 59/93 |
| 4,411,132 | 10/1983 | Crook, Jr. | 59/93 |
| 4,623,109 | 11/1986 | Sadeck | 244/142 |
| 4,664,342 | 5/1987 | Jones | 244/149 |

Primary Examiner—Galen Barefoot
Assistant Examiner—Rodney Corl
Attorney, Agent, or Firm—Webb, Burden, Ziesenheim & Webb

[57] ABSTRACT

A plastic shield for a connector link for connecting parachute shroud lines and a riser. The protector shield has a first member with channels which receive a portion of the connector link and a second member which is complementary with the first member and has channels which receive a portion of the connector link. The first and second members of the protector shield are attached by a set screw in surrounding relationship to a portion of the connector link to minimize contact between the connector link and a slider grommet on the shroud lines when the parachute slider and slider grommets located thereon move downwardly along the shroud lines so that the surface of the slider grommet is not nicked by contact with the connector link.

16 Claims, 1 Drawing Sheet

GROMMET AND CONNECTOR LINK PROTECTOR SHIELD

BACKGROUND OF THE INVENTION

1. Field of the Invention

The invention relates generally to parachutes, and more particularly to a protector shield for preventing contact between the slider grommet which surrounds the parachute shroud lines and the connector link which connects the lower end of the parachute shroud lines to the upper end of a riser in order to eliminate nicking of the slider grommet surface and subsequent surface fraying of the shroud lines.

2. Description of the Prior Art

A parachute having a canopy with either a square or a rectangular configuration is used in the sport of skydiving. A plurality of shroud lines extend downwardly from the canopy, and the lower end of the shroud lines connect to the upper end of a metal connector link. The parachute also includes a plurality of fabric risers each of which has its upper end attached to the lower end of a connector link. The lower end of each riser is attached to a harness to hold the parachutist. A fabric square or rectangular slider having a metal slider grommet surrounding the shroud lines is located adjacent each corner of the fabric slider. When the parachute is packed, the slider grommets hold the upper ends of the shroud lines together. As the parachute opens, the slider slides downwardly along the shroud lines and eventually the metal slider grommet contacts the upper end of the metal connector link. After a plurality of parachute jumps, the surface of each slider grommet becomes nicked and roughened due to the repeated contact with a connector link and the slider grommets must be replaced so that they do not fray the shroud lines which results in wear and consequent replacement of shroud lines.

SUMMARY OF THE INVENTION

The invention is a plastic protector shield which surrounds a portion of the connector link and is dimensioned to prevent the slider grommets from hitting the connector link when the canopy opens. This prevents nicks from occurring on the surface of the slider grommets and prevents fraying of the parachute shroud lines by nicks on the surface of the slider grommets. Thus, the protector shield minimizes replacement of both slider grommets and frayed shroud lines.

In addition to the above-referenced protection feature, the protector shield of the invention is constructed with a chamber which is dimensioned to prevent the closure nut on the connector link from accidentally turning. In the prior art arrangements, in order to insure that the closure nut on a connector link is secure, the closure nut is often overtightened which strips the threads on the closure nut or on the connector link or both and such requires replacement of the connector link.

BRIEF DESCRIPTION OF THE DRAWINGS

FIG. 11 is a schematic view of a parachute assembly.

DESCRIPTION OF THE PREFERRED EMBODIMENT

Figure 1:
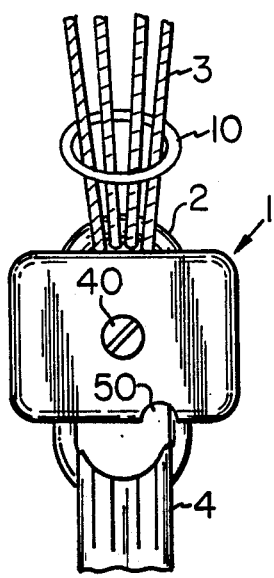
FIG. 1 is an elevation view showing a protector shield in place around a connector link with shroud lines and a riser attached to the connector link.

FIG. 1 shows the protector shield 1 in position on a connector link 2 which has a plurality of parachute shroud lines 3 attached to its rounded upper end portion and a riser 4 attached to its rounded lower portion end. The protector shield and connector link are shown separately in FIG. 2 of the drawings in the assembled condition.

Figure 3:
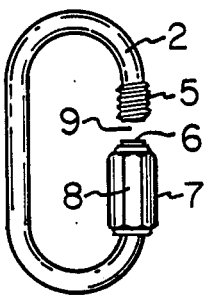
FIG. 3 is an elevation view of a connector link showing the closure nut in the open position.
Figure 4:
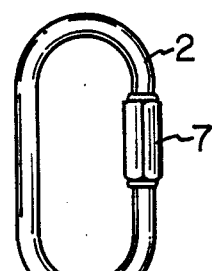
FIG. 4 is an elevation view of a connector link showing the closure nut in the closed condition.
Figure 7:
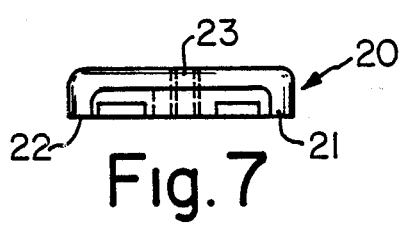
FIG. 7 is an end view of the member of the protector shield on line VII—VII in FIG. 6.

As shown in FIGS. 3 and 4 of the drawings, the connector link consists of a first C-shaped part having an unbroken leg and a leg with an opening therein. The connector link has a substantially continuous circular cross section except at the externally threaded end portions 5 and 6 which are located adjacent to the opening 9. A connector link closure nut 7 having interior threads (not shown) is shown in the open position in FIG. 3 of the drawings whereby the parachute shroud lines 3 and the riser 4 can be placed within the connector link through the opening 9 after which the closure nut 7 is rotated to move it into the closed position shown in FIG. 4 of the drawings. The closure nut is formed with a plurality of flat surfaces 8 around its outer periphery in order to accommodate a wrench or similar tool to tighen the interior threads on the closure nut on the exterior threads 5 when the nut is rotated into the closed position shown in FIG. 4 of the drawings.

Figure 10:
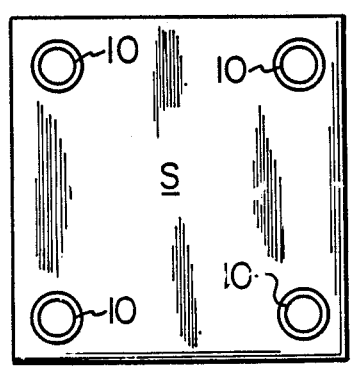
FIG. 10 is a plan view of a slider.

As shown in FIG. 1 of the drawings, a metal slider grommet 10 is positioned around a number of parachute shroud lines 3 extending downwardly from a corner of the canopy to a connector link. The slider grommets are carried on a fabric slider S as shown in FIG. 10 of the drawings. When the parachute canopy opens, each slider grommet 10 slides downwardly along a plurality of shroud lines and in the prior art arrangements contacts the metal connector link which nicks the surface of the slider grommet and the link, and as a result of the nicks, the slider grommets eventually begin to fray the parachute shroud lines. By utilizing the protector shield 1 of the invention around the connector link 2, nicking of the surfaces of the slider grommets is substantially eliminated, and hence the slider grommets and the parachute shroud lines both have a substantially longer life resulting in less expense and inconvenience to the user of the parachute.

Figure 2:
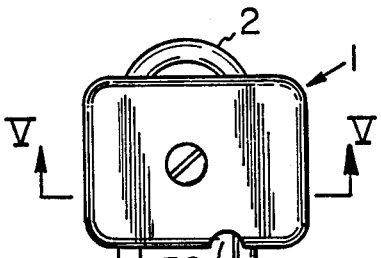
FIG. 2 is an elevation view of a protector shield and a connector link.
Figure 8:
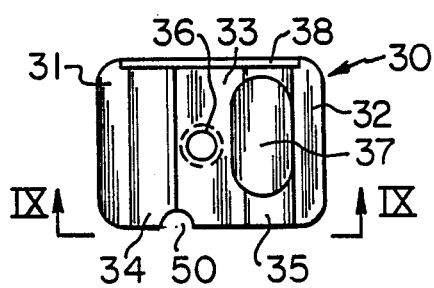
FIG. 8 is a plan view of the second complementary member of the protector shield.
Figure 9:
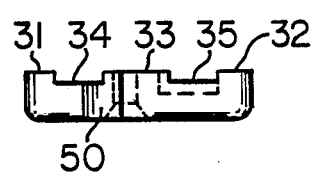
FIG. 9 is an end view of the member of the protector shield on line IX—IX in FIG. 8.
Figure 6:
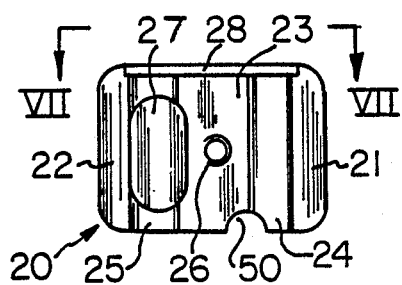
FIG. 6 is a plan view of one member of the protector shield.

The protector shield consists of a first member 20 having edge ridges 21 and 22 along each side and a center ridge 23. The ridges define a pair of spaced substantially parallel channels 24 and 25 extending from one end of the member to the opposite end of the member. A central hole 26 is formed in the center ridge 23 of the member 20, and this hole is formed with internal threads (not shown) for a purpose to be described hereinafter. The channel 25 is formed along its length with an intermediate depression 27 which extends from the edge ridge 22 to and slightly within the center ridge 23. An elongated upwardly opening recess 28 is formed along the upper end of member 20 in order to accommodate the shroud lines when the protector is assembled around the connector link 2 as shown in FIG. 1 of the drawings. The second or opposite member 30 of protector shield 1 is shown in FIGS. 8 and 9 of the drawings and is complementary to the first member 20 when the two members are assembled. Thus, protector member 30 has a pair of edge ridges 31 and 32 along each side and a center ridge 33. The ridges define space substantially parallel channels 34 and 35 which extend from one end of the member 30 to the opposite end and are complementary with channels 24 and 25 in member 20 to form spaced substantially parallel passageways. The channel 35 in member 30 is formed with a depression 37 which is complementary with the depression 27 in member 20 when the members are assembled to form a closed chamber with a channel opening at each end. An elongated upwardly opening recess 38 is formed along the upper end of member 30 and is complementary with the recess 28 in member 20. The ridge 33 in member 20 is formed with an unthreaded hole 36 extending therethrough which is aligned with the hole 26 when the two members of the protector shield are assembled as shown in FIGS. 1 and 2 of the drawings. The hole 36 is formed with a countersink portion at its outer end. As is apparent from FIGS. 1 and 2 of the drawings, the hole 36 receives a flathead set screw 40 which is threadedly received in the interiorly threaded hole 26 in member 20 to firmly hold the two members of the protector shield together when it is assembled about the connector link.

Figure 5:
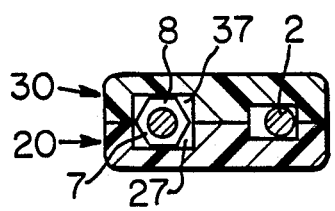
FIG. 5 is a section view on line V—V of FIG. 2.

As seen in FIG. 5 of the drawings, when the two members of the protector shield are assembled in abutting relation, the passageway formed by channels 24 and 34 receives the unbroken leg of the C-shaped connector link 2, and the passageway formed by channels 25 and 35 receives the open side of the C-shaped connector link and the closure nut 7 is located within the chamber formed by depressions 27 and 37. As further shown in FIG. 5 of the drawings, the dimensions and shape of the chamber formed by depressions 27 and 37 are such that top and bottom surfaces of the chamber contact two of the flats 8 on the hexagonally shaped closure nut 7 to prevent the closure nut from rotating. This is an important advantage of the protector shield since it holds the closure nut 7 in position against rotation without requiring that the nut be overtightened which in prior art connector links often caused stripped threads on the connector link and/or the closure nut thus requiring replacement of the connector link when it was necessary to open the nut for replacement of parachute shroud lines and/or the riser.

It will be seen in the drawings that the lower end of each member of the connector link is formed with a hemispherical notch 50. The reason for the notches 50 is to provide sufficient room to permit a cross member to pass through the connector link.

The protector link can be made from any type of synthetic plastic material such as a polyurethane, a polycarbonate or a polyacrylate such as, for example, polymerized methyl methacrylate.

It will be seen that the unique protector shield of the invention prevents nicking of the surface of the metal slider grommet caused by repeated contact with the connector link and additionally prevents overtightening of the connector link closure nut 7 when the closure nut is in the closed position shown in FIG. 4 of the drawings.

While a preferred embodiment of the invention has been described herein, it is to be understood that the invention may be embodied within the scope of the appended claims.

I claim:

1. In a parachute assembly including a canopy, a slider having a plurality of slider grommets, a plurality of shroud lines having a first end attached to said canopy and a second end, a plurality of connector links each of which includes a closure nut adapted to be moved between a closed position and an open position, each of said connector links having first and second ends, a number of shroud lines of said plurality of shroud lines having said second end connected to said first end of one of said connector links, one of said slider grommets on said slider surrounding said number of shroud lines and located between said canopy and said first end of said one of said connector links and a riser having a first end attached to said second end of said one of said connector links, the improvement comprising: a protector shield for each of said connector links, said protector shield having a first member with channel means for surrounding a portion of said connector link, a second member complementary with said first member and having channel means for surrounding said portion of said connector link and means for attaching said first member of said protector shield to said second member of said protector shield with said channel means in said first member and said channel means in said second member forming a first passageway in surrounding relationship with said portion of said connector link, whereby said protector shield minimizes contact between said slider grommet and said connector link when said canopy is opened and said slider and said slider grommet move downwardly along said shroud lines to minimize nicking of the surface of said slider grommet by contact between the surface of said slider grommet and said connector link and subsequent fraying of said shroud lines by said slider grommet.

2. The improvement set forth in claim 1 wherein said channel means in each of said first and second members of said protector shield form parallel first and second spaced passageways extending through said protector shield.

3. The improvement set forth in claim 2 wherein said channel means are formed by spaced substantially parallel edge ridges on said first and second members of said protector shield and a central ridge on said first and second members of said protector shield spaced from and substantially parallel with said edge ridges.

4. The improvement set forth in claim 3 wherein one of said first and second spaced passageways in said first and second members of said protector shield is formed with a depression intermediate the ends of said passageway and extending partially into said central ridges of said first and second members of said protector shield, whereby when said first and second members of said protector shield are attached to each other, said depressions form a chamber adapted to accommodate said closure nut on said connector link when said closure nut is in the closed position.

5. The improvement set forth in claim 4 wherein said chamber is formed with a base surface and a top surface and said closure nut is formed with flat surfaces around its periphery and a pair of opposed flat surfaces of said closure nut is in contact with said base surface and said top surface of said chamber to prevent said closure nut from rotating when it is located within said chamber.

6. The improvement set forth in claim 1 wherein each of said first and second members of said protector shield has a centrally located hole therein, one of said holes being internally threaded and said means for attaching said first and second members of said protector shield to each other is a set screw extending through one of said holes and internally threaded in the other of said holes.

7. The improvement set forth in claim 1 wherein said protector shield is made of any one of a polyurethane, a polycarbonate or a polyacrylate.

8. The improvement set forth in claim 1 wherein each of said first and second members of said protector shield is formed with an upwardly opening recess extending along an end of said member.

9. A protector shield adapted to surround a portion of a connector link for connecting parachute shroud lines to a riser, said protector shield having a first member with channel means for surrounding a portion of said connector link, a second member complementary with said first member and having channel means for surrounding said portion of said connector link and means for attaching said first member of said protector shield to said second member of said protector shield with said channel means in said first member and said channel means in said second member forming a first passageway in surrounding relationship to said portion of said connector link, whereby said protector shield minimizes the contact between said connector links and a slider grommet on shroud lines when a slider grommet moves downwardly along shroud lines to minimize nicking of the surface of the slider grommet by contact between the surface of the slider grommet and a connector link and subsequent fraying of shroud lines by the slider grommet.

10. A protector shield as set forth in claim 9 wherein said channel means in each of said first and second members of said protector shield form parallel first and second spaced passageways extending through said protector shield.

11. A protector shield as set forth in claim 10 wherein said channel means are formed by spaced substantially parallel edge ridges on said first and second members of said protector shield and a central ridge on said first and second members of said protector shield spaced from and substantially parallel with said edge ridges.

12. A protector shield as set forth in claim 11 wherein one of said first and second spaced passageways in said first and second members of said protector shield is formed with a depression intermediate the ends of said passageway and extending partially into said central ridges of said first and second members of said protector shield, whereby when said first and second members of said protector shield are attached to each other, said depressions form a chamber adapted to accommodate a closure nut on a connector link.

13. A protector shield as set forth in claim 12 wherein the connector link has a closure nut formed with flat surfaces around its periphery and said chamber has a base surface and a top surface which are adapted to a pair of opposed flat surfaces to prevent rotation of the closure nut when it is located within said chamber.

14. A protector shield as set forth in claim 9 wherein each of said first and second members of said protector shield has a centrally located hole therein, one of said holes being internally threaded and said means for attaching said first and second members to each other is a set screw extending through one of said holes and internally threaded in the other of said holes.

15. A protector shield as set forth in claim 9 wherein said protector shield is made of any one of a polyurethane, a polycarbonate or a polyacrylate.

16. A protector shield as set forth in claim 9 wherein each of said first and second members has an elongated recess at one end, whereby said recesses are adapted to receive a portion of shroud lines.

* * * * *